United States Patent
Turski et al.

(10) Patent No.: US 8,661,036 B2
(45) Date of Patent: Feb. 25, 2014

(54) METADATA EDITING CONTROL

(75) Inventors: Andrzej Turski, Redmond, WA (US);
Cornelis K. Van Dok, Bellevue, WA (US); Lili Cheng, Bellevue, WA (US);
Lyon K. F. Wong, Issaquah, WA (US);
Matthew B. MacLaurin, Woodinville, WA (US); Patrice L. Miner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 763 days.

(21) Appl. No.: 12/183,724

(22) Filed: Jul. 31, 2008

(65) Prior Publication Data

US 2008/0288531 A1    Nov. 20, 2008

Related U.S. Application Data

(63) Continuation of application No. 10/950,075, filed on Sep. 24, 2004, now Pat. No. 7,421,438.

(60) Provisional application No. 60/566,502, filed on Apr. 29, 2004.

(51) Int. Cl.
*G06F 7/00* (2006.01)

(52) U.S. Cl.
USPC ........... 707/737; 707/805; 715/763; 715/781; 717/162

(58) Field of Classification Search
None
See application file for complete search history.

(56) References Cited

U.S. PATENT DOCUMENTS

| | | |
|---|---|---|
| 4,881,179 A | 11/1989 | Vincent |
| 5,060,135 A | 10/1991 | Levine et al. |
| 5,241,671 A | 8/1993 | Reed et al. |
| 5,297,250 A | 3/1994 | Leroy et al. |
| 5,327,529 A | 7/1994 | Fults et al. |
| 5,333,266 A | 7/1994 | Boaz et al. |
| 5,333,315 A | 7/1994 | Saether et al. |
| 5,388,196 A | 2/1995 | Pajak et al. |
| 5,420,605 A | 5/1995 | Vouri et al. |
| 5,461,710 A | 10/1995 | Bloomfield et al. |

(Continued)

FOREIGN PATENT DOCUMENTS

| | | |
|---|---|---|
| CN | 1421800 | 6/2003 |
| GB | 2329492 | 3/1999 |

(Continued)

OTHER PUBLICATIONS

Microsoft Windows XP Version 2002 (Screen Dumps, FIGs 1-16).

(Continued)

*Primary Examiner* — Debbie Le
*Assistant Examiner* — Hasanul Mobin
(74) *Attorney, Agent, or Firm* — Shook, Hardy & Bacon L.L.P.

(57) ABSTRACT

A metadata management architecture. The architecture includes a property component that lists one or more properties related to a file, and a viewing component that present files having one or more of the related properties. A synchronization component provides immediate synchronization between property editing fields of the property component and a view in the property-based browser component, providing both instantaneous feedback on property changes and an ability to manipulate properties graphically. Thus, a change in the property pane is immediately reflected in the view component, and a change in the view component is immediately reflected in the property pane.

22 Claims, 12 Drawing Sheets

(56) References Cited

U.S. PATENT DOCUMENTS

| | | | |
|---|---|---|---|
| 5,499,364 A | 3/1996 | Klein et al. | |
| 5,504,852 A | 4/1996 | Thompson-Rohrlich | |
| 5,513,306 A | 4/1996 | Mills et al. | |
| 5,544,360 A | 8/1996 | Lewak et al. | |
| 5,546,527 A | 8/1996 | Fitzpatrick et al. | |
| 5,550,852 A | 8/1996 | Patel et al. | |
| 5,559,948 A | 9/1996 | Bloomfield et al. | |
| 5,583,982 A | 12/1996 | Matheny et al. | |
| 5,590,259 A | 12/1996 | Anderson et al. | |
| 5,596,702 A | 1/1997 | Stucka et al. | |
| 5,598,524 A | 1/1997 | Johnston, Jr. et al. | |
| 5,600,778 A | 2/1997 | Swanson et al. | |
| 5,606,669 A | 2/1997 | Bertin et al. | |
| 5,625,783 A | 4/1997 | Ezekiel et al. | |
| 5,630,042 A | 5/1997 | McIntosh et al. | |
| 5,648,795 A | 7/1997 | Vouri et al. | |
| 5,652,876 A | 7/1997 | Ashe et al. | |
| 5,675,520 A | 10/1997 | Pitt, III et al. | |
| 5,680,563 A * | 10/1997 | Edelman | 715/835 |
| 5,696,486 A | 12/1997 | Poliquin et al. | |
| 5,696,914 A | 12/1997 | Nahaboo et al. | |
| 5,701,926 A | 12/1997 | Luisi | |
| 5,757,925 A | 5/1998 | Faybishenko | |
| 5,760,770 A | 6/1998 | Bliss et al. | |
| 5,790,121 A | 8/1998 | Sklar et al. | |
| 5,802,516 A | 9/1998 | Shwarts et al. | |
| 5,831,606 A | 11/1998 | Nakajima et al. | |
| 5,835,094 A | 11/1998 | Ermel et al. | |
| 5,838,317 A | 11/1998 | Bolnick et al. | |
| 5,838,322 A | 11/1998 | Nakajima et al. | |
| 5,842,020 A * | 11/1998 | Faustini | 717/111 |
| 5,844,554 A * | 12/1998 | Geller et al. | 715/744 |
| 5,855,446 A | 1/1999 | Disborg | |
| 5,867,163 A | 2/1999 | Kurtenbach | |
| 5,870,088 A * | 2/1999 | Washington et al. | 715/781 |
| 5,875,446 A | 2/1999 | Brown et al. | |
| 5,875,448 A | 2/1999 | Boys et al. | |
| 5,878,410 A | 3/1999 | Zbikowski et al. | |
| 5,886,694 A | 3/1999 | Breinberg et al. | |
| 5,899,995 A | 5/1999 | Millier et al. | |
| 5,907,703 A | 5/1999 | Kronenberg et al. | |
| 5,907,837 A | 5/1999 | Ferrel et al. | |
| 5,909,540 A | 6/1999 | Carter et al. | |
| 5,917,492 A * | 6/1999 | Bereiter et al. | 715/854 |
| 5,923,328 A | 7/1999 | Griesmer | |
| 5,929,854 A | 7/1999 | Ross | |
| 5,930,801 A | 7/1999 | Falkenhainer et al. | |
| 5,933,139 A | 8/1999 | Feigner et al. | |
| 5,935,210 A | 8/1999 | Stark | |
| 5,973,686 A | 10/1999 | Shimogori | |
| 5,987,454 A | 11/1999 | Hobbs | |
| 5,987,506 A | 11/1999 | Carter et al. | |
| 6,003,040 A | 12/1999 | Mital et al. | |
| 6,008,806 A | 12/1999 | Nakajima et al. | |
| 6,014,137 A | 1/2000 | Burns | |
| 6,016,692 A | 1/2000 | Schaenzer et al. | |
| 6,021,262 A | 2/2000 | Cote et al. | |
| 6,023,708 A | 2/2000 | Mendez et al. | |
| 6,024,843 A | 2/2000 | Anderson et al. | |
| 6,025,843 A | 2/2000 | Sklar | |
| 6,037,944 A | 3/2000 | Hugh | |
| 6,055,540 A | 4/2000 | Snow et al. | |
| 6,055,543 A | 4/2000 | Christensen et al. | |
| 6,061,059 A | 5/2000 | Taylor et al. | |
| 6,061,692 A | 5/2000 | Thomas et al. | |
| 6,061,695 A | 5/2000 | Slivka et al. | |
| 6,065,012 A | 5/2000 | Balsara et al. | |
| 6,078,924 A | 6/2000 | Ainsbury et al. | |
| 6,097,389 A | 8/2000 | Morris et al. | |
| 6,101,509 A | 8/2000 | Hanson et al. | |
| 6,144,968 A | 11/2000 | Zellweger | |
| 6,147,601 A | 11/2000 | Sandelman et al. | |
| 6,160,552 A | 12/2000 | Wilsher et al. | |
| 6,175,364 B1 | 1/2001 | Wong et al. | |
| 6,181,342 B1 | 1/2001 | Niblack | |
| 6,182,092 B1 | 1/2001 | Francis et al. | |
| 6,202,061 B1 | 3/2001 | Khosla et al. | |
| 6,216,122 B1 | 4/2001 | Elson | |
| 6,237,004 B1 | 5/2001 | Dodson et al. | |
| 6,237,011 B1 | 5/2001 | Ferguson et al. | |
| 6,240,407 B1 | 5/2001 | Chang et al. | |
| 6,240,421 B1 | 5/2001 | Stolarz | |
| 6,243,094 B1 | 6/2001 | Sklar | |
| 6,243,724 B1 | 6/2001 | Mander et al. | |
| 6,246,411 B1 | 6/2001 | Strauss | |
| 6,256,031 B1 | 7/2001 | Meijer et al. | |
| 6,268,852 B1 | 7/2001 | Lindhorst et al. | |
| 6,275,829 B1 | 8/2001 | Angiulo et al. | |
| 6,279,016 B1 | 8/2001 | De Vorchik et al. | |
| 6,301,586 B1 | 10/2001 | Yang et al. | |
| 6,308,173 B1 | 10/2001 | Glasser et al. | |
| 6,317,142 B1 | 11/2001 | Decoste et al. | |
| 6,324,541 B1 | 11/2001 | de l'Etraz et al. | |
| 6,324,551 B1 | 11/2001 | Lamping et al. | |
| 6,326,953 B1 | 12/2001 | Wana | |
| 6,330,007 B1 | 12/2001 | Isreal et al. | |
| 6,339,767 B1 | 1/2002 | Rivette et al. | |
| 6,341,280 B1 | 1/2002 | Glass et al. | |
| 6,342,907 B1 | 1/2002 | Petty et al. | |
| 6,356,863 B1 | 3/2002 | Sayle | |
| 6,356,915 B1 | 3/2002 | Chtchetkine et al. | |
| 6,363,377 B1 | 3/2002 | Kravets et al. | |
| 6,363,400 B1 | 3/2002 | Chtchetkine et al. | |
| 6,369,840 B1 | 4/2002 | Barnett et al. | |
| 6,377,283 B1 | 4/2002 | Thomas | |
| 6,401,097 B1 | 6/2002 | McCotter et al. | |
| 6,405,265 B1 | 6/2002 | Kronenberg et al. | |
| 6,408,298 B1 | 6/2002 | Van et al. | |
| 6,411,311 B1 | 6/2002 | Rich et al. | |
| 6,425,120 B1 | 7/2002 | Morganelli et al. | |
| 6,425,121 B1 | 7/2002 | Phillips | |
| 6,430,575 B1 | 8/2002 | Dourish et al. | |
| 6,430,835 B1 | 8/2002 | Ranucci et al. | |
| 6,437,807 B1 | 8/2002 | Berquist et al. | |
| 6,438,590 B1 | 8/2002 | Gartner et al. | |
| 6,448,985 B1 | 9/2002 | McNally | |
| 6,453,311 B1 | 9/2002 | Powers, III | |
| 6,453,319 B1 | 9/2002 | Mattis et al. | |
| 6,462,762 B1 | 10/2002 | Ku et al. | |
| 6,466,228 B1 | 10/2002 | Ulrich et al. | |
| 6,466,238 B1 | 10/2002 | Berry et al. | |
| 6,466,932 B1 | 10/2002 | Dennis et al. | |
| 6,470,344 B1 | 10/2002 | Kothuri et al. | |
| 6,473,100 B1 | 10/2002 | Beaumont et al. | |
| 6,480,835 B1 | 11/2002 | Light | |
| 6,483,525 B1 | 11/2002 | Tange | |
| 6,505,233 B1 | 1/2003 | Hanson et al. | |
| 6,513,038 B1 | 1/2003 | Hasegawa et al. | |
| 6,519,612 B1 | 2/2003 | Howard et al. | |
| 6,526,399 B1 | 2/2003 | Coulson et al. | |
| 6,535,229 B1 | 3/2003 | Kraft | |
| 6,535,230 B1 | 3/2003 | Celik | |
| 6,539,399 B1 | 3/2003 | Hazama et al. | |
| 6,544,295 B1 | 4/2003 | Bodnar | |
| 6,549,217 B1 | 4/2003 | De Greef et al. | |
| 6,549,916 B1 | 4/2003 | Sedlar | |
| 6,563,514 B1 | 5/2003 | Samar | |
| 6,571,245 B2 | 5/2003 | Huang et al. | |
| 6,573,906 B1 | 6/2003 | Harding et al. | |
| 6,573,907 B1 | 6/2003 | Madrane | |
| 6,583,799 B1 | 6/2003 | Manolis et al. | |
| 6,590,585 B1 | 7/2003 | Suzuki et al. | |
| 6,606,105 B1 | 8/2003 | Quartetti | |
| 6,613,101 B2 | 9/2003 | Mander et al. | |
| 6,628,309 B1 | 9/2003 | Dodson et al. | |
| 6,636,238 B1 | 10/2003 | Amir et al. | |
| 6,636,250 B1 | 10/2003 | Gasser | |
| 6,638,313 B1 | 10/2003 | Freeman et al. | |
| 6,658,406 B1 | 12/2003 | Mazner et al. | |
| 6,662,198 B2 | 12/2003 | Satyanarayanan et al. | |
| 6,684,222 B1 | 1/2004 | Cornelius et al. | |
| 6,686,938 B1 | 2/2004 | Jobs et al. | 717/114 |
| 6,691,301 B2 * | 2/2004 | Bowen | 717/114 |
| 6,721,760 B1 | 4/2004 | Ono et al. | |

(56) References Cited

U.S. PATENT DOCUMENTS

| | | |
|---|---|---|
| 6,735,623 B1 | 5/2004 | Prust |
| 6,738,770 B2 | 5/2004 | Gorman |
| 6,745,206 B2 | 6/2004 | Mandler et al. |
| 6,745,207 B2 | 6/2004 | Reuter et al. |
| 6,751,626 B2 | 6/2004 | Brown et al. |
| 6,754,829 B1 | 6/2004 | Butt et al. |
| 6,760,721 B1 | 7/2004 | Chasen et al. |
| 6,762,776 B2 | 7/2004 | Huapaya |
| 6,762,777 B2 | 7/2004 | Carroll |
| 6,763,458 B1 | 7/2004 | Watanabe et al. |
| 6,763,777 B1 | 7/2004 | Rosenberg |
| 6,768,999 B2 | 7/2004 | Prager et al. |
| 6,784,900 B1 | 8/2004 | Dobronsky et al. |
| 6,784,925 B1 | 8/2004 | Tomat et al. |
| 6,795,094 B1 | 9/2004 | Watanabe et al. |
| 6,801,909 B2 | 10/2004 | Delgado et al. |
| 6,801,919 B2 | 10/2004 | Hunt et al. |
| 6,803,926 B1 | 10/2004 | Lamb et al. |
| 6,813,474 B2 | 11/2004 | Robinson et al. |
| 6,816,863 B2 | 11/2004 | Bates et al. |
| 6,820,083 B1 | 11/2004 | Nagy et al. |
| 6,823,344 B1 | 11/2004 | Isensee et al. |
| 6,826,443 B2 | 11/2004 | Makinen |
| 6,847,959 B1 | 1/2005 | Arrouye et al. |
| 6,853,391 B2 | 2/2005 | Bates et al. |
| 6,865,568 B2 | 3/2005 | Chau |
| 6,871,348 B1 | 3/2005 | Cooper |
| 6,876,900 B2 | 4/2005 | Takeda et al. |
| 6,876,996 B2 | 4/2005 | Czajkowski et al. |
| 6,880,132 B2 | 4/2005 | Uemura |
| 6,883,009 B2 | 4/2005 | Yoo |
| 6,883,146 B2 | 4/2005 | Prabhu et al. |
| 6,906,722 B2 | 6/2005 | Hrebejk et al. |
| 6,910,049 B2 | 6/2005 | Fenton et al. |
| 6,922,709 B2 | 7/2005 | Goodman |
| 6,925,608 B1 | 8/2005 | Neale et al. |
| 6,938,207 B1 | 8/2005 | Haynes |
| 6,944,647 B2 | 9/2005 | Shah et al. |
| 6,947,959 B1 | 9/2005 | Gill |
| 6,973,618 B2 | 12/2005 | Shaughnessy et al. |
| 7,185,316 B1 * | 2/2007 | Morris et al. ................ 717/116 |
| 7,747,625 B2 | 6/2010 | Gargi et al. |
| 2001/0034733 A1 | 10/2001 | Prompt et al. |
| 2001/0034771 A1 | 10/2001 | Hutsch et al. |
| 2001/0047368 A1 | 11/2001 | Oshinsky et al. |
| 2001/0049675 A1 | 12/2001 | Mandler et al. |
| 2001/0053996 A1 | 12/2001 | Atkinson |
| 2001/0056434 A1 | 12/2001 | Kaplan et al. |
| 2001/0056508 A1 | 12/2001 | Arneson et al. |
| 2002/0010736 A1 | 1/2002 | Marques et al. |
| 2002/0019935 A1 | 2/2002 | Andrew et al. |
| 2002/0033844 A1 | 3/2002 | Levy et al. |
| 2002/0046232 A1 | 4/2002 | Adams et al. |
| 2002/0046299 A1 | 4/2002 | Lefeber et al. |
| 2002/0049717 A1 | 4/2002 | Routtenberg et al. |
| 2002/0052885 A1 | 5/2002 | Levy |
| 2002/0054167 A1 | 5/2002 | Hugh |
| 2002/0059199 A1 | 5/2002 | Harvey |
| 2002/0062310 A1 | 5/2002 | Marmor et al. |
| 2002/0063734 A1 | 5/2002 | Khalfay et al. |
| 2002/0070965 A1 | 6/2002 | Austin |
| 2002/0075310 A1 | 6/2002 | Prabhu et al. |
| 2002/0075312 A1 | 6/2002 | Amadio et al. |
| 2002/0075330 A1 | 6/2002 | Rosenzweig et al. |
| 2002/0087652 A1 | 7/2002 | Davis et al. |
| 2002/0087740 A1 | 7/2002 | Castanho et al. |
| 2002/0087969 A1 | 7/2002 | Brunheroto et al. |
| 2002/0089540 A1 | 7/2002 | Geier et al. |
| 2002/0091679 A1 | 7/2002 | Wright |
| 2002/0091697 A1 | 7/2002 | Huang et al. |
| 2002/0091739 A1 | 7/2002 | Ferlitsch et al. |
| 2002/0095416 A1 | 7/2002 | Schwols |
| 2002/0097278 A1 | 7/2002 | Mandler et al. |
| 2002/0100039 A1 | 7/2002 | Iatropoulos et al. |
| 2002/0103998 A1 | 8/2002 | DeBruine |
| 2002/0104069 A1 | 8/2002 | Gouge et al. |
| 2002/0107973 A1 | 8/2002 | Lennon et al. |
| 2002/0111942 A1 | 8/2002 | Campbell et al. |
| 2002/0113821 A1 | 8/2002 | Hrebejk et al. |
| 2002/0120505 A1 | 8/2002 | Henkin et al. |
| 2002/0120604 A1 | 8/2002 | Labarge et al. |
| 2002/0120757 A1 | 8/2002 | Sutherland et al. |
| 2002/0129033 A1 | 9/2002 | Hoxie et al. |
| 2002/0138552 A1 | 9/2002 | DeBruine et al. |
| 2002/0138582 A1 | 9/2002 | Chandra et al. |
| 2002/0138744 A1 | 9/2002 | Schleicher et al. |
| 2002/0144155 A1 | 10/2002 | Bate et al. |
| 2002/0149888 A1 | 10/2002 | Motonishi et al. |
| 2002/0152262 A1 | 10/2002 | Arkin et al. |
| 2002/0152267 A1 | 10/2002 | Lennon |
| 2002/0156756 A1 | 10/2002 | Stanley et al. |
| 2002/0196276 A1 | 12/2002 | Corl et al. |
| 2003/0063124 A1 * | 4/2003 | Melhem et al. ................ 345/777 |
| 2003/0097410 A1 * | 5/2003 | Atkins et al. ................ 709/206 |
| 2003/0158617 A1 * | 8/2003 | Turpin et al. ................ 700/97 |
| 2004/0174396 A1 * | 9/2004 | Jobs et al. ................ 345/810 |
| 2004/0215657 A1 * | 10/2004 | Drucker et al. ............ 707/104.1 |
| 2005/0086239 A1 * | 4/2005 | Swann et al. ................ 707/100 |
| 2005/0102258 A1 | 5/2005 | Tecu et al. |
| 2008/0222547 A1 | 9/2008 | Wong et al. |

FOREIGN PATENT DOCUMENTS

| | | |
|---|---|---|
| JP | 09244940 | 9/1997 |
| JP | 2001067250 | 8/1999 |
| JP | 2001142766 | 5/2001 |
| JP | 2001154831 | 6/2001 |
| JP | 2001154831 A | 6/2001 |
| JP | 2001188702 | 7/2001 |
| JP | 2002099565 | 4/2002 |
| JP | 2002099565 | 5/2002 |
| JP | 2002182953 | 6/2002 |
| JP | 2002269145 | 9/2002 |
| JP | 2002334103 | 11/2002 |
| JP | 2003067226 A | 3/2003 |
| NO | 20042749 | 8/2004 |
| NO | 20042749 A | 8/2004 |
| WO | WO9322738 | 11/1993 |
| WO | 9412944 A | 6/1994 |
| WO | WO9412944 | 6/1994 |
| WO | WO9414281 | 6/1994 |
| WO | WO9938092 | 7/1999 |
| WO | WO9949663 | 9/1999 |
| WO | 0051021 A | 8/2000 |
| WO | WO0051021 | 8/2000 |
| WO | WO0157867 | 8/2001 |
| WO | WO0163919 | 8/2001 |
| WO | WO0167668 | 9/2001 |
| WO | WO0225420 | 3/2002 |
| WO | WO03001720 | 1/2003 |
| WO | 2004097680 A | 11/2004 |
| WO | WO2004097680 | 11/2004 |
| WO | WO2004107151 | 12/2004 |

OTHER PUBLICATIONS

The Korean Office Action mailed Apr. 22, 2011 for Korean Patent Application No. 10-2005-35949, a counterpart foreign application of US Patent No. 7,421,438.

Translation Korean Office Action mailed Apr. 22, 2011 for Korean Patent Application 10/2005/35949, 1 page.

Translated Japanese Office Action mailed on Jan. 28, 2011 for Japanese Patent Application No. 2005-131741, a counterpart foreign applicaiton of US Patent No. 7,421,438.

Nagai, "For Real Beginners and for Real Use: Wisdom of Windows Senior Users", PC Mode, vol. 9, No. 3, pp. 128-131, Mainichi Communications, Inc., Japan, Mar. 4, 2004.

Cohen, et al., A Case for Associative Peer to Peer Overlays, ACM SIGCOMM Computer Communications Review, vol. 33, No. 1, Jan. 2003, pp. 95-100.

Ohtani, et al., A File Sharing Method for Storing Area Network and Its Performance Verification, NEC Res & Develop., 44(1): 85-90, Jan. 2003.

(56) References Cited

OTHER PUBLICATIONS

Verhoeven, et al., A Generic Metadata Query Tool, 1999, p. 1-8.
Anciaux, et al., A Tamper-Resistant and Portable Healthcare Folder, Hindawi Publishing Corporation, International Journal of Telemedicine and Applications, vol. 2008, Article ID 763534, 9 pages.
About Dialog Boxes, retrieved from <<http://msdn.microsoft.com>> on Feb. 21, 2005, 10 pages.
Cooper, About Face: The Essentials of User Interface Design, IDG Books Worldwide Inc., 1995, pp. 141.
About Managing Messages with Rules, Microsoft Outlook 2003 Help file, MSFT\22618 RULES PRIOR ART.doc, 3 pages.
Qian, et al., ACLA: A Framework for Access Control List (ACL) Analysis and Optimization, p. 197-211, Fifth Joint Working Conference on Communications and Multimedia Security, Germany 2001.
Adobe, Inc., Adobe Photoshop 7.0, 2001, 9 pages.
Adobe, Inc., Adobe Photoshop CS Classroom in a Book, Dec. 1, 2003, Adobe Press, pp. 1-29.
Kwon, et al., An Efficient Peer-to-Peer File Sharing Exploiting Hierarchy and Asymmetry, Proceedings of the 2003 Symposium on Applications and the Internet (SAINT 2003), 9 pages.
Lee, An End-User Perspective on File-Sharing Systems, Communications of the ACM, Feb. 2003, vol. 46, No. 2, pp. 49-53.
Ferri, et al., An Object-Oriented Model for a Multimedia Patient Folder Management System, Proceedings of the 1996 Symposium on Applied Computing, ACM 1996, pp. 2-18.
Hunter, An Overview of the MPEG-7 Description Definition Language (DDL), IEEE Transactions on Circuits and Systems for Video Technology, vol. 11, No. 6, Jun. 2001, pp. 765-772.
Australian Search Report for Application No. SG 200301757-1, dated Dec. 1, 2004, 4 pages.
Australian Written Opinion for Application No. SG 200301764-7 dated Mar. 30, 2006, 4 pages.
Ahanger, et al., Automatic Composition Techniques for Video Production, IEEE Transactions on Knowledge and Data Engineering, vol. 10, No. 6, Nov./Dec. 1998, pp. 967-987.
BCM_GETIDEALSIZE Message (Windows Explorer and Controls), retrieved from <<http://msdn.microsoft.com>> on Mar. 31, 2005, 1 page.
Bott, et al., Master Your Music Library, <<www.microsoft.com/windowsxp/using/windowsmediaplayer/expert/bott_03may05.mspx>>, May 5, 2003, 7 pages.
Button Messages (Windows Explorer and Controls), retrieved from <<http://msdn.microsoft.com>> on Feb. 25, 2005, 4 pages.
Button Styles (Windows Explorer and Controls), retrieved from <<http://msdn.microsoft.com>> on Feb. 25, 2005, 2 pages.
English translation of Chinese Office Action for CN03801850.0, dated Aug. 10, 2007, 6 pages.
Manjunath, et al., Color and Texture Descriptors, IEEE Transations on Circuits and Systems for Video Technology, vol. 11, No. 6, Jun. 2001, pp. 703-715.
Common Dialog Box Library, retrieved from <<http://msdn.microsoft.com>> on Apr. 20, 2005, 8 pages.
Capretz, et al., Component-Based Software Development, IECON 2001, The 27th Annual Conference of the IEEE Industrial Electronics Society, pp. 1834-1837.
Louis, et al., Context Learning Can Improve User Interaction, IEEE 2004, pp. 115-120.
CreatePropertySheetPage Function, retrieved from <<http://msdn.microsoft.com>> on Mar. 31, 2005, 2 pages.
CreateWindow Function, retrieved from <<http://msdn.microsoft.com>> on Feb. 25, 2005, 5 pages.
Creating an Enhanced Metafile, retrieved at <<http://msdn.microsoft.com>> on Apr. 20, 2005, 2 pages.
Creating and Installing Theme Files, retrieved at <<http://msdn.microsoft.com>> on Feb. 21, 2005, 4 pages.
Creating Wizards (Windows Explorer and Controls), retrieved on <<http://msdn.microsoft.com>> on Mar. 31, 2005, 18 pages.
Customizing Common Dialog Boxes, retrieved from <<http://msdn.microsoft.com>> on Apr. 20, 2005, 4 pages.
DestroyPropertySheetPage Function (Windows Explorer and Controls), retrieved from <<http://msdn.microsoft.com>> on Mar. 31, 2005, 1 page.
DialogProc Function, retrieved from <<http://msdn.microsoft.com>> on Feb. 21, 2005, 2 pages.
Directory Opus 6.1—Viewer Plugin SDK 1.0, GP Software, 2001, retrieved from <<http://web.archive.org/web/20030219151121/www.gpsoft.com.au/Developer.html>>, archived on Feb. 19, 2003, 32 pages.
"A Basket" definition, Dorot, Explanatory Dictionary on Modern Computer Vocabulary, S. Peterburg, BHV-Petersburg, pp. 218-219.
DrawItemStruct Structure, downloaded from <<http://msdn.microsoft.com>>, date of first publication prior to Feb. 25, 2005, 3 pages.
Piernas, et al., DualFS: A New Journaling File System Without Meta-Data Duplication, ICS 2002, Jun. 2002, New York, NY, 12 pages.
Esposito, More Windows 2000 UI Goodies: Extending Explorer Views by Customizing Hypertext Template Files, MSDN Magazine, <<http://msdn.microsoft.com/msdnmag/issues/0600/w2kui2/default.aspx?print=true?>>, retrieved on Dec. 6, 2006, 15 pages.
Esposito, New Graphical Interface: Enhance Your Programs with New Windows XP Shell Features, MSDN Magazine, Nov. 2001, vol. 16, No. 11, 16 pages.
Esposito, Visual C++ Windows Shell Programming, Dec. 1, 1998, Apress, ISBN 1861001843, Chapter 15, pp. 463-469.
European Search Report dated Sep. 20, 2007 for European Patent Application No. 05 10 3492, 9 pages.
Examination Report for New Zealand Patent Application No. 534665, dated Jul. 27, 2007, 2 pages.
Examples of dialogs user interfaces; dated of first publication prior to Mar. 31, 2005, 8 pages.
McCray, et al., Extending the Role of Metadata in a Digital Library System, Research and Technology Advances in Digital Libraries 1999 Proceedings, IEEE.
Campbell, Extending the Windows Explorer with Name Space Extensions, Microsoft Systems Journal, Jul. 1996, pp. 29-38.
Kuchinsky, et al., Fotofile: A Consumer Multimedia Organization and Retrieval System, CHI 1999, May 15-20, 1999, pp. 496-503.
GetOpenFileName Function, retrieved from <<http://msdn.microsoft.com/library/en-us/winui/winui/windowsuserinterface/userinput/com>> on Apr. 20, 2005, 2 pages.
GetSaveFileName Function, retrieved at <<http://msdn.microsoft.com/library/en-us.winui/winui/windowsuserinterface/userinput.com>> on Apr. 20, 2005, 2 pages.
Manber, et al., GLIMPSE: A Total Tool to Search Through Entire File Systems, Proceedings of USENIX Winter 1994 Conference, San Francisco, CA, Jan. 17-21, 1994.
Faichney, et al., Goldleaf Hierarchical Document Browser, IEEE 2011, pp. 13-20.
Sellen, et al., How Knowledge Workers Use the Web, CHI 2002, Apr. 20-25, 2002, vol. 4, Issue No. 1, pp. 227-234.
How to Use a Common Dialog File Open Dialog with Win32 API, retrieved from <<http://support.microsoft.com/default.aspx?scid=kb;en-us;161286>> on Mar. 28, 2008, 3 pages.
Implementing Windows Terminal Server and Citrix MetaFrame on IBM @server xSeries Servers, International Business Machines Corp, Apr. 2003, 1st Edition, 62 pages.
InfoVision Information Management System, retrieved at <<66.102.7.104/search?q=cache:m1XV6K6sQ0QJ:www.amlib.net/products/infovision.htm+customised+multi+property+file+navigation&hl=en>> on Apr. 21, 2005, 12 pages.
Heinlein, et al., Integration of Message Passing and Shared Memory in the Stanford FLASH Multiprocessor, ASPLOS VI, Oct. 1994, ACM 1994, pp. 38-50.
Internal Structure of NTFS4.0 Second Volume, Nikkei Windows 2000, No. 53, pp. 176-182, Nikkei Business Publications, Inc., Japan, Aug. 1, 2001.
International Search Report and Written Opinion of PCT/US04/25931, dated Apr. 3, 2007.
International Search Report dated Dec. 7, 2005 for PCT Application Serial No. PCT/US05/13589, 5 pages.

(56) References Cited

OTHER PUBLICATIONS

International Search Report dated Jun. 23, 2005 for PCT Application No. PCT/US05/26655.
International Search Report dated Nov. 11, 2004 for Application Serial No. WO2004/097638.
International Search Report dated Jun. 13, 2006 for EP 03007909.
International Search Report dated Aug. 8, 2003 for PCT/US03/15625.
International Search Report dated Feb. 24, 2006 for PCT/US05/27258, 9 pages.
International Search Report dated Sep. 25, 2007 for PCT Application Serial No. PCT/US06/26854.
International Search Report dated Aug. 6, 2004 for EP Application Serial No. EP 03007786.
International Search Report dated Aug. 26, 2003 for EP Application No. EP 0315717.
Lui, et al., Interoperability of Peer-To-Peer File Sharing Protocols, ACM SIGecom Exchanges, vol. 3, No. 3, Aug. 2002, pp. 25-33.
Coster, et al., Inverted File Search Algorithm for Collaborative Filtering, SIGIR 2002, Finland, ACM 2002, pp. 246-252.
Jamsa, 1001 Windows 98 Tips, Jamsa Press 1998, 3 pages.
Office Action for Japanese Patent Application 2004-571417, mailed on Feb. 17, 2009, 10 pages.
Translated Japanese Office Action mailed Feb. 3, 2012 for Japanese patent application No. 2005-131741, a counterpart foreign application of US patent No. 7,421,438, 7 pages.
Langer, Mac OS X: Visual QuickStart Guide, Peachpit Press, Apr. 18, 2001, Outlines and Mac OS X Disk Organization (pp. 1-3), Views (pp. 1-11).
MessageBox Function, retrieved at <<http://msdn.microsoft.com/library/en-us/winui/winui/windowsuserinterface/windowing/dialog>> on Mar. 31, 2005, 4 pages.
Lee, et al., Metadata Management of the SANtopia File System, Proceedings of the 8th International Conference on Parallel and Distributed Systems (ICPADS 2001), Kyoungio City, Korea, Jun. 26-29, 2011, pp. 492-499, IEEE Computer Society, 2001.
Microsoft Digital Image Suite User's Manual, Chapter 11: Organizing and Archiving in Digital Image Library, pp. 107-118, Version 9, retrieved at <<http://www.microsoft.com/products/imaging/guides/SuiteManual.pdf>> on Apr. 30, 2003.
Halverson, et al., Microsoft Office XP Professional, Running Microsoft Office 2000 Premium, Microsoft Corp 1999, pp. 78-80.
Microsoft Windows 2000 Professional Step by Step—Lesson 3, Managing Files and Folders, <<http://www.microsoft.com/mspress.books/samshap/1589.asp>>, Jan. 5, 2000, 12 pages.
Microsoft Windows 98 Step by Step, Microsoft Press, Catapult 1998, p. 63.
Microsoft Windows XP, section 1: "To change how you view items in a folder". section 2: "Viewing files and folders overview", section 3: "To Associate a File with a Program", Section 4: "To Change of Remove a Program", copyright 2006, 6 pages.
Bott, et al., Microsoft Windows XP Inside Out, Microsoft Press, 2001, Chapter 11, pp. 377-412.
Microsoft Windows XP Professional, 1985-2001, 3 pages.
Microsoft Windows XP Professional, Screen Shots 1-8, copyright 1985-2001, 13 pages.
Microsoft Windows XP Version 2002, Screen Dumps, Figs. 1-16.
DiLascia, More Fun with MFC: DIBs, Palettes, Subclassing, and a Gamut of Goodies, Part III, Microsoft Systems Journal, Jun. 1997, 12 pages, retrieved from <<http://www.microsoft.com/msj/0697/mfc3/mfc3.aspx>> on Apr. 3, 2012.
Na, et al., Multimedia File Sharing in Multimedia Home or Office Business Networks, IEEE 2003, pp. 237-241.
Miksovsky, Session Code: CLI304, New user interface possiblities in Longhon, retrieved from <<http://msdn.microsoft.com/longhorn/pdcmaterials/pdstalksavalon/>>, 45 pages, 2003-2004.
Office Action for U.S. Appl. No. 11/568,447, mailed on Jun. 22, 2011, Wong, et al., "Save Preview Representation of Files Being Created", 9 pages.
Office Action for U.S. Appl. No. 11/568,447, mailed on Dec. 15, 2011, Wong, et al., "Save Preview Representation of Files Being Created", 10 pages.
Final Office Action for U.S. Appl. No. 12/195,984, mailed on Sep. 14, 2011, Andrzej Turski, "Metadata Editing Control", 18 pages.
Final Office Action for U.S. Appl. No. 12/193,445, mailed on Sep. 14, 2011, Andrzej Turski, "Metadata Editing Control", 14 pages.
Open and Save as Dialog Boxes, downloaded from <<http://msdn.microsoft.com>> on Apr. 20, 2005, 9 pages.
OpenFileName Structure, downloaded from <<http://msdn.microsoft.com>> on Apr. 20, 2005, 7 pages.
Blair, et al. Optimal Sequential File Search: A Reduced-State Dynamic Programming Approach, European Journal of Operational Research 86(2): 358-365, 1995.
Organize Your Digital Media Collection, Jun. 30, 2003, <<http://microsoft.com/windowsxp/using/windowsmediaplayer/getstarted/organize.mspx>> 3 pages.
Clay, et al., Posting Protocol for Improved Keyword Search Success in Peer-to-Peer File Sharing Systems, Multimedia Computing and Networking 2003, Proceedings of SPIE-IS&T Electronic Imaging, SPIE vol. 5019 (2003), 13 pages.
Predefined Properties (SAP Library—Knowledge Management Platform—Administration), pp. 1-4, retrieved from <<http://help.sap.com/saphelp_ep50sp5/helpdata/en/la/9a4a3b80f2ec40aa7456bc87a94259/content.html>> on Apr. 21, 2005.
Dourish, et al., Presto: An Experimental Architecture for Fluid Interactive Document Spaces, ACM Transactions on Computer-Human Interaction, 6(2), 133-161, 1999, pp. 1-24.
Previewing Files (Apple Developer Connection), retrieved from <<http://developer.apple.com/documentation/QuickTime/INMAC/OT/iqMovieToolbox.1.a.htm>>, on Apr. 21, 2005.
Sever, Previewing Files in the Common Dialog, retrieved from <<http://www.elitevb.com/content/01,0084,01/>> on Apr. 21, 2005, 3 pages.
McCray, et al., Principles for Digital Library Development, Communications of the ACM, May 2001, vol. 44, No. 5, pp. 49-54.
Property Sheet Reference (Windows Explorer and Controls), retrieved from <<http://msdn.microsoft.com>> on Mar. 31, 2005, 5 pages.
Property Sheets (Windows Explorer and Controls), retrieved from <<http://msdn.microsoft.com>> on Mar. 31, 2005, 7 pages.
Property Sheets and Inspectors, retrieved from <<http://msdn.microsoft.com>> on Feb. 21, 2005, 6 pages.
PropertySheet Function, downloaded from <<http://msdn.microsoft.com>> on Mar. 31, 2005, 2 pages.
PropSheetHeater Structure (Windows Explorer and Controls), pp. 1-5, retrieved at <<http://msdn.microsoft.com>> on Mar. 31, 2005.
PropSheetPage, retrieved from <<http://msdn.microsoft.com>> on Feb. 21, 2005, 3 pages.
PropSheetPage Structure (Windows Explorer and Controls), retrieved from <<http://msdn.microsoft.com>> on Mar. 31, 2005, 4 pages.
PropSheetPageProc Function (Windows Explorer and Controls), retrieved from <<http://msdn.microsoft.com>> on Mar. 31, 2005, 2 pages.
PropSheetProc Function (Windows Explorer and Controls), retrieved from http://msdn.microsoft.com>> on Mar. 31, 2005, 2 pages.
PSHNotify Structure (Windows Explorer and Controls), retrieved from <<http://msdn.microsoft.com>> on Mar. 31, 2005, 1 page.
PSM_ADDPAGE Message (Windows Explorer and Controls), retrieved from <<http://msdn.microsoft.com>> on Mar. 31, 2005, 2 pages.
PSM_HWNDTOINDEX Message (Windows Explorer and Controls), retrieved from <<http://msdn.microsoft.com>> on Mar. 31, 2005, 1 page.
PSM_IDTOINDEX Message (Windows Explorer and Controls), retrieved from <<http://msdn.microsoft.com>> on Mar. 31, 2005, 1 page.
PSM_INDEXTOHWND Message (Windows Explorer and Controls), retrieved from <<http://msdn.microsoft.com>> on Mar. 31, 2005, 1 page.

(56) References Cited

OTHER PUBLICATIONS

PSM_INDEXTOID Message (Windows Explorer and Controls), retrieved at <<http://msdn.microsoft.com>> on Mar. 31, 2005, 1 page.
PSM_INDEXTOPAGE Message (Windows Explorer and Controls), retrieved from <<http://msdn.microsoft.com>> on Mar. 31, 2005, 1 page.
PSM_PAGETOINDEX Message (Windows Explorer and Controls), retrieved from <<http://msdn.microsoft.com>> on Mar. 31, 2005, 1 page.
PSM_PRESSBUTTON Message (Windows Explorer and Controls), retrieved from <<http://msdn.microsoft.com>> on Mar. 31, 2005.
PSM_QUERYSIBLINGS Message (Windows Explorer and Controls), retrieved at <<http://msdn.microsoft.com>> on Mar. 31, 2005, 1 page.
PSM_SETCURSEL Message (Windows Explorer and Controls), retrieved at <<http://msdn.microsoft.com>> on Mar. 31, 2005, 1 page.
Desai, et al., Resource Discovery: Modelling, Cataloguing and Searching, IEEE 1996, pp. 70-75.
Feng, et al., Schemata transformation of object-oriented conceptual models to XML, International Journal of Computer Systems Science and Engineering, vol. 18, No. 1, Jan. 2003, pp. 45-60.
Gifford, et al., Semantic File Systems, ACM 1991, pp. 16-25.
Bott, et al., Special Edition Using Windows 98, Second Edition, book overview, retrieved from <<http://proquest.safaribooksonline.com/0789722038>> on Jun. 4, 2007, 7 pages.
McFedries, The Complete Idiot's Guide to Windows XP, Alpha books, 2001, includes table of contents, Chapter 8: A Tour of the My Pictures Folder—printed pp. 1-7, and Chapter 11: Sights and Sounds: Music and Other Multi-media, printed pp. 1-3.
McFedries, The Complete Idiot's Guide to Windows XP, Alpha books, 2001, includes: table of contents, Ch. 6—"Using My Computer to Fiddle with Files and Folders", pp. 1-6.
Joseph, The UML for data modellers, Elektron Apr. 2004, pp. 72-73.
Cohen, The Unofficial Guide to the Workplace Shell, Apr. 15, 1992, CP002227246, 45 pages, retrieved from <<http://www.verfasser.de/web/web.nsf/c5>>.
Grosky, et al., Using Metadata for the Intelligent Browsing of Structured Media Objects, SIGMOD Record, vol. 23, No. 4, Dec. 1994, pp. 49-56.
Sekiguchi, Visual Basic Q&A, msdn magazine 2001, No. 16, pp. 97-103, ASCII Inc., Japan, Jul. 18, 2001.
Sugasawa, When and What of Pictures Become Clear! How to Readily Organize Images from Digital Cameras, Nikkei PC Beginners 2003, vol. 2, pp. 78-95.
Rathbone, Windows XP for Dummies, Wiley Publishing, 2001, pp. 145, 196, 203, 204.
Windows XP is Here!, Microsoft PressPass—Information for Journalists, Oct. 25, 2001, 4 pages.
Notice of Allowance dated Nov. 7, 2013 in U.S. Appl. No. 12/193,445, 19 pages.

* cited by examiner

METADATA EDITING CONTROL

CROSS-REFERENCE TO RELATED APPLICATIONS

This application is a continuation of U.S. patent application Ser. No. 10/950,075, filed on Sep. 24, 2004, entitled "METADATA EDITING CONTROL", which claims the benefit of U.S. Provisional Patent Application Ser. No. 60/566,502, filed on Apr. 29, 2004, entitled "METADATA EDITING CONTROL". The entireties of the aforementioned applications are incorporated herein by reference.

TECHNICAL FIELD

This invention is related to data systems, and more specifically, to metadata editing and viewing mechanisms.

BACKGROUND OF THE INVENTION

Advances in information technology continue to demand increasingly larger storage capabilities and consequently, improvements in the way a user can query and navigate through such large amounts of data. Computers and portable computing devices are ubiquitous with each class of devices having its own data access and management considerations. In support thereof, data storage techniques and access methodologies continue to evolve to meet these demands. However, such evolving systems can take significant departures from conventional data access, navigation, and storage regimes. Thus, users who might have been relatively familiar with the traditional systems now must become savvy to the newer methodologies.

Currently, typical applications have a few menu commands that facilitate the modification of document metadata (e.g., in a Microsoft OFFICE brand suite of applications running on a WINDOWS XP brand operating system). A Save command is used to update the current version of the document on the hard drive. For a new document being saved for the very first time, Save invokes a SaveAs dialog. Otherwise, the update is performed transparently with no dialog. The SaveAs command creates a new version of the document file on the hard drive, and starts by bringing up a dialog window to set the properties needed to uniquely identify the file.

In the Windows XP brand operating system, the identifying properties can include, for example, a file name, a file type (file name extension), and a location of the file in the folder tree (collectively, these properties are called a file path). The SaveAs dialog includes a folder tree browser similar to an Open dialog and a WINDOWS EXPLORER brand browser viewer. This reinforces the feeling of a folder as a place-if the file is placed there, it can be found there later. Additionally, the browser shows the other files in each folder location. This facilitates an informed decision if a given folder is the right place to save the new document. It also supports one-click copying of the file identifying properties—when an existing file is clicked, the new file name is set to the same value and the newly-saved document assumes the identity and replace the existing one.

A Properties option brings up a dialog to set the document metadata, such as Author, Title, Subject, Category, Keywords, Comments, etc. In a Windows XP brand operating system, document metadata are auxiliary—they can be visible in the browser view, but they cannot actually be used to browse the disk content across multiple folders.

A Versions option allows the creation of multiple versions of the document. In a Windows XP brand operating system, versioning is not supported at the system level; therefore, the implementation is application dependent. Many applications choose to keep all the versions in a single file. Other applications allow setting the version property, but different versions must have different file identity and are not linked together. Thus, user interaction with properties is cumbersome and unfriendly.

What is needed is an improved metadata management system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises architecture for property editing control. The invention provides immediate synchronization between property editing fields of a property pane and a view in a property-based browser, providing both instantaneous feedback on property changes and an ability to manipulate properties graphically. Thus, a change in the property pane is immediately reflected in the view component, and a change in the view component is immediately reflected in the property pane.

In another aspect thereof, when browsing properties in the view, displaying a clustered view based on a mutable property automatically activates visually a corresponding property editing field. However, if displaying a clustered view based on an immutable property, editing of the corresponding property field is disabled.

In still another aspect of the subject invention, an artificial intelligence component is provided that employs a probabilistic and/or statistical-based analysis to prognose or infer an action that a user desires to be automatically performed.

To the accomplishment of the foregoing and related ends, certain illustrative aspects of the invention are described herein in connection with the following description and the annexed drawings. These aspects are indicative, however, of but a few of the various ways in which the principles of the invention can be employed and the invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
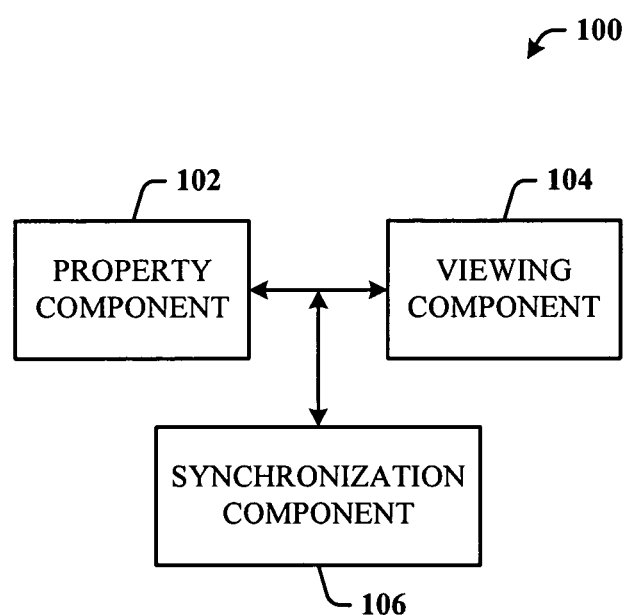
FIG. 1 illustrates a system that synchronizes a property pane and a property view in accordance with the subject invention.

The invention is now described with reference to the drawings, wherein like reference numerals are used to refer to like elements throughout. In the following description, for purposes of explanation, numerous specific details are set forth in order to provide a thorough understanding of the invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is depicted a system 100 that synchronizes a property pane and a property view in accordance with the subject invention. The invention is an improved user interface (UI) object for use in metadata management. Document metadata includes one or more properties (e.g., author, title, subject, data created, category, keywords, to name just a few) that can be exposed for management, e.g., editing and control. The UI object includes a property editing control in which the property editing fields and the view of a property-based browser are synchronized, providing both feedback on property changes and a capability to manipulate properties graphically. Direct visual feedback is provided to the user between the browser and the property fields in a property pane so that as the user selects a property in the property pane (when the browser is open), the browser automatically switches to grouping by that property. This feedback capability has analogies to an existing SaveAs dialog control, which is a user interface control used for determining where and under what name to store a file. This enhances the learning curve for users.

In support thereof, a property component 102 is provided that facilitates the presentation to a user of a property pane that further presents property information in the form of text that is associated with a file. The system 100 also includes a viewing component 104 that interfaces to the property component 102 and facilitates viewing a graphical representation of the property information and/or further data associated with the properties. One example of a viewing mechanism is a browser. The viewing component 104 provides for the presentation of at least the following: a list of common properties (labels) that may be set; a list of existing/allowed property values for each property, where the property can be set to the value with a simple click; showing the list of other files that have a given property value to help making a choice about grouping together; and, copying of properties (labels) from an existing file to the saved one (setting properties by example).

A synchronization component 106 interfaces to both the property component 102 and the viewing component 104 to facilitate the synchronization or instantaneous update of changes between the property component 102 and the viewing component 104. Thus, when the user has both the property pane and the browser window open, making a change to the property pane will be automatically reflected substantially immediately to the browser window, and making a change in the browser window will be reflected substantially instantaneously in the property pane.

Figure 2:
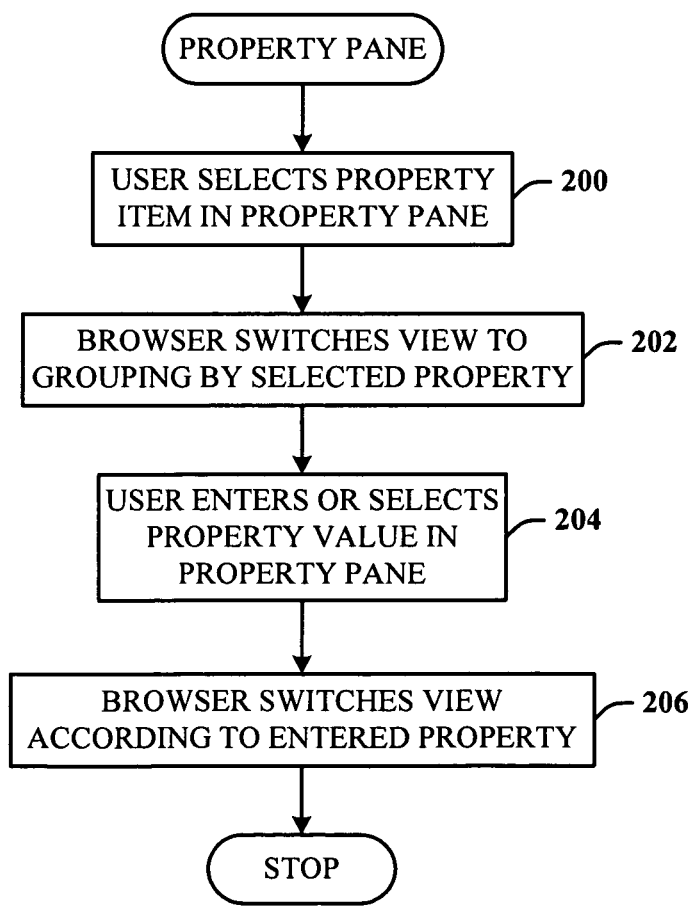
FIG. 2 illustrates a flow chart of a methodology in accordance with a property pane of the invention.

FIG. 2 illustrates a methodology in accordance with a property pane of the invention. While, for purposes of simplicity of explanation, the one or more methodologies shown herein, e.g., in the form of a flow chart, are shown and described as a series of acts, it is to be understood and appreciated that the invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a user selects a property item in the property pane. At 202, if the browser is open, the browser switches to grouping by the selected property. Note that the grouping can be by stacking or by a property tree, for example. At 204, the user enters or selects a property value for the property in a property pane. At 206, this interaction is instantaneously reflected visually in the browser.

For example, clicking on an author field can result in showing the files stacked by author, with the default author (the current user name) selected (or highlighted). When the user types in an additional name, the corresponding stack also gets highlighted. If this is a new name, a new stack is generated and added (with a document "ghost" inside). The concept of a document ghost is described in detail hereinbelow.

Note also that the system can be made configurable according to a user profile or preferences setting to automatically open the browser when the user interacts with the property pane. This can be an alternative to the user manually selecting an "Open Browser" radio button or menu selection, for example.

Figure 3:
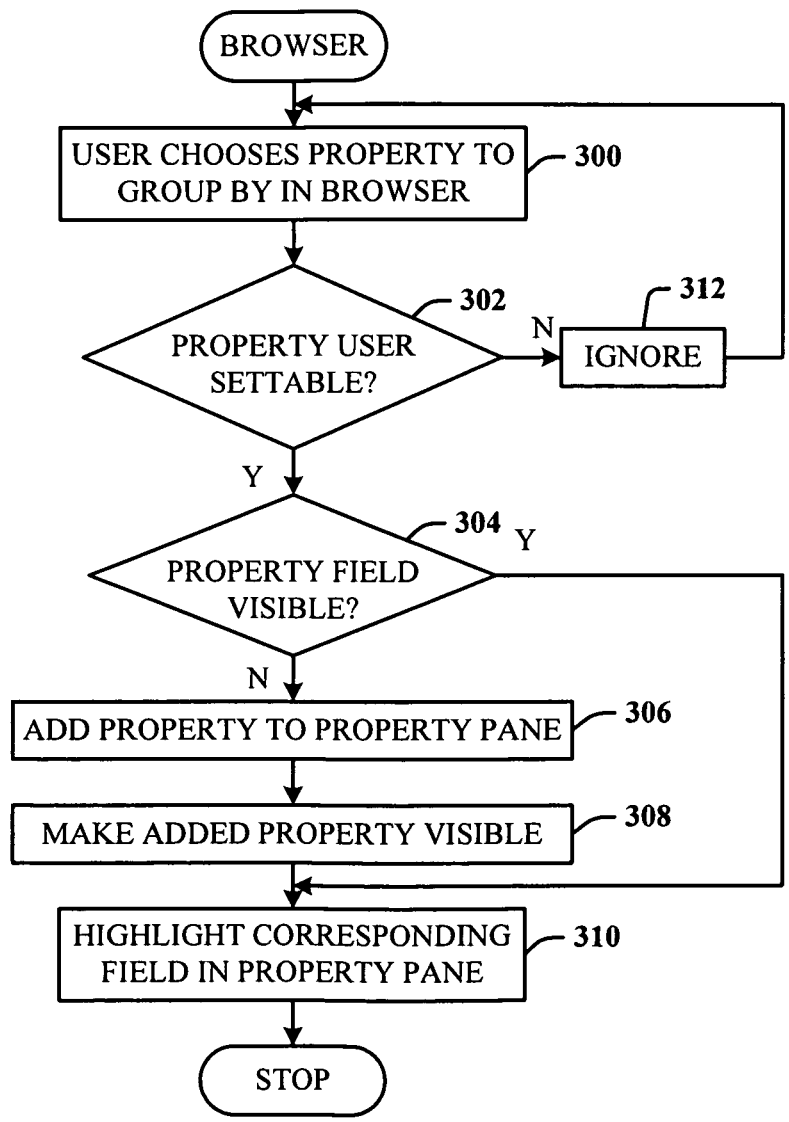
FIG. 3 illustrates a flow chart of a methodology in accordance with a property browser of the invention.

FIG. 3 illustrates a methodology in accordance with controlling a property browser of the invention. At 300, the user chooses a property to group by in the browser. At 302, the system determines if the property is user settable. If so, at 304, the system next determines if the property field is visible in the property pane. This is an indication that the property may need to be added to the property pane (and not that it is out of view, but viewable by scrolling a scrollbar). If the property field was not visible (e.g., the user selected a custom property called "Project") it will be automatically added to the pane, as indicated at 306. At 308, the system makes the added property visible. Where the pane is sufficiently large, the added field will be visible. Otherwise, the property pane can be made scrollable with a scrollbar such that if needed, the user can scroll to view the added item. At 310, the visible property is then highlighted. At 302, if the property is not user settable, any attempted user interaction is ignored, as indicated at 312, and flow is back to 300. Similarly, at 306, if the property field is visible, flow is to 310 where the field is highlighted.

Figure 4:
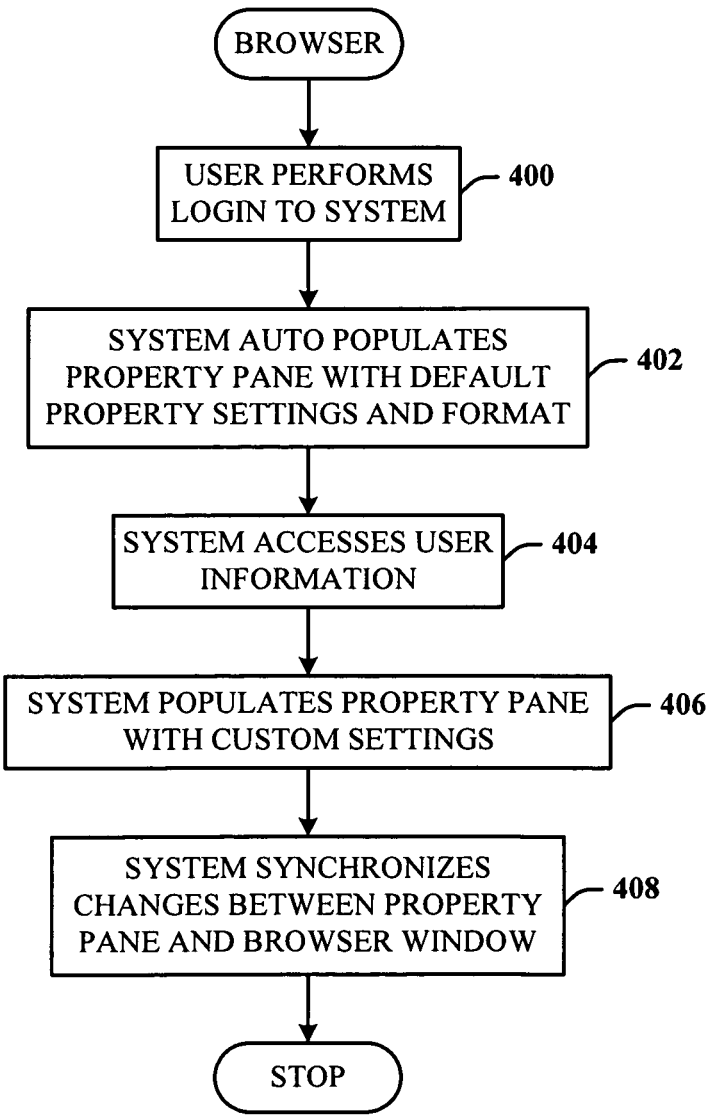
FIG. 4 illustrates a flow chart of a methodology of populating a property pane in accordance with the invention.

Referring now to FIG. 4, there is depicted a methodology of populating a property pane in accordance with the invention. At 400, the user logs into the system. This can be a login process associated with a client login and/or a network login, for example. At 402, the system automatically populates the property pane with the default property settings and format. At 404, the system accesses user information. This can be preferences information that the user configures and/or other information stored and enabled in response to the system accessing user login information (client and/or network). At 406, the system populates the property pane with custom settings that are configured by the user. The custom settings can include all of the default settings plus some non-default settings, overlap with the default settings to include some of the default settings and some of the non-default settings, or be non-overlapping to include only non-default settings and not include any of the default settings. At 408, the system operates to synchronize changes or interactions between the property pane and the browser.

Note that in another implementation, the user can be provided a limited capability to change the format or cosmetics of the property pane and/or property browser. For example, the user can change aspects such as color, font, text size, property pane window size, to name just a few.

In yet another implementation, the custom settings automatically "bubble" to the top of the property pane, since these are likely to be the preferred properties for immediate viewing by the user (without having to scroll, for example). When the user selects a group in the browser, the custom property field substantially instantaneously changes to reflect the selection.

Browsing through immutable properties that are not normally user-settable (like Date or Size) would have no effect, except for allowing to narrow down the visible scope. The same applies to browsing though immutable dynamic lists. The system provided the user with immediate visible feedback that no property was set in the course of navigation, since no property was selected in the property pane. For example, the user may have many "Projects" on the user machine, and can choose to narrow down the browser scope to items modified in the last month to quickly limit the list of "Projects" to those that are still active.

In a concept called query refinement, the user can choose to query files according to more than one property. Thus, the user can combine Author, Date, and Document Type to more quickly narrow a search for related files.

Figure 5:
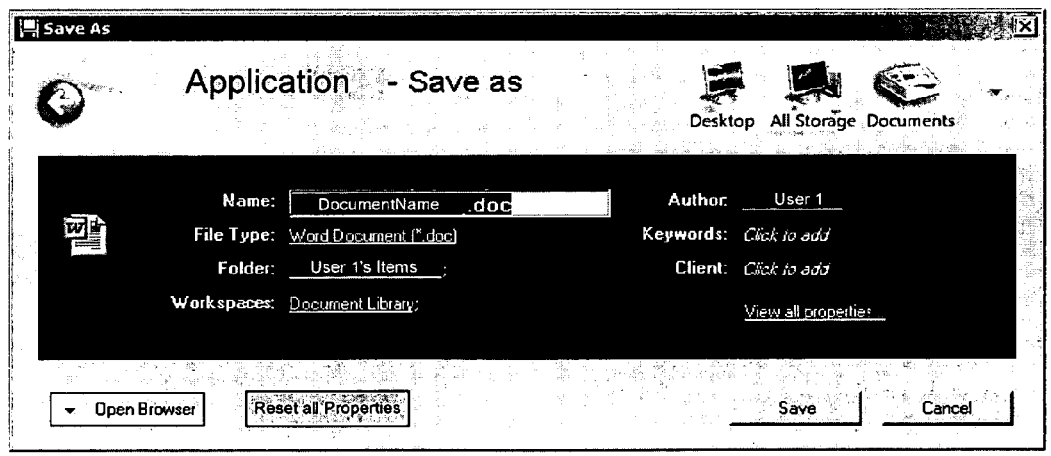
FIG. 5 illustrates a screenshot of a minimized property pane in accordance with the invention.

Referring now to FIG. 5, there is illustrated a screenshot 500 of a minimized property pane in accordance with the invention. When considering a query-oriented file system, the meaning and functionality of Save and metadata editing commands can change. On such systems, a file browser can retrieve the files based on file properties. Therefore, traditional folder system will not be the only classification method. Moreover, the system will allow for multiple files with the same name and other user-assigned properties. The files can be distinguished by a global unique internal identifier (GUID) and immutable properties (e.g., creation/last modification date/time). It the light of these changes or added capabilities, two updated Save-related commands are provided.

Save. If a new document has never been saved before, Save will invoke SaveAs. Otherwise, Save can be used to save a version of the file. Note that many contemporary applications have no need to save the document explicitly, as the programs may have the capability to remember all the changes automatically. Together with the potential to store multiple versions of the same document, the real meaning of user-initiated Save is to create a checkpoint, i.e., a separate version that can be retrieved later (thus replacing a Versions command).

SaveAs. The main purpose of SaveAs is to assign properties needed for the file retrieval. In a database-oriented system, the file can be retrieved by any set of file properties, not just file path. Consequently, the SaveAs dialog can used to set all these properties. There is no need for a separate Properties dialog, since its functionality is taken over by SaveAs.

In the minimized SaveAs property pane 500, the SaveAs command can be a place to assign all user-settable document properties. It can propose the default and best-guess values for these properties, so the user need only click Save (or "OK" where such a button is provided) to accept the choices and initiate saving of the file.

The minimized SaveAs property pane dialog 500 is particularly appealing to users who are satisfied with the default values of metadata properties. It is hardly enough, however, if the document requires a more advanced classification mechanism. Many prospective users will still prefer the folder look. In support thereof, an "Open Browser" button is provided that appends a visual element to the property pane by placing the file in a specific place, which reintroduces the preferred synergy between SaveAs, Open, and Windows Explorer. Otherwise, a user is not provided a means to retrieve a file, and he/she is not always confident they will be able to do it indirectly via more complex steps.

The following discloses how visual components can be integrated into a property editing control. They are described in a context of a SaveAs dialog, but have a broader range of applications—all metadata editing controls can use the same ideas. In particular, a file browser can provide a command to edit properties of an existing file; the dialog to edit these properties can have a very similar design, even if the functionality does not involve saving the file to the disk.

Figure 6:
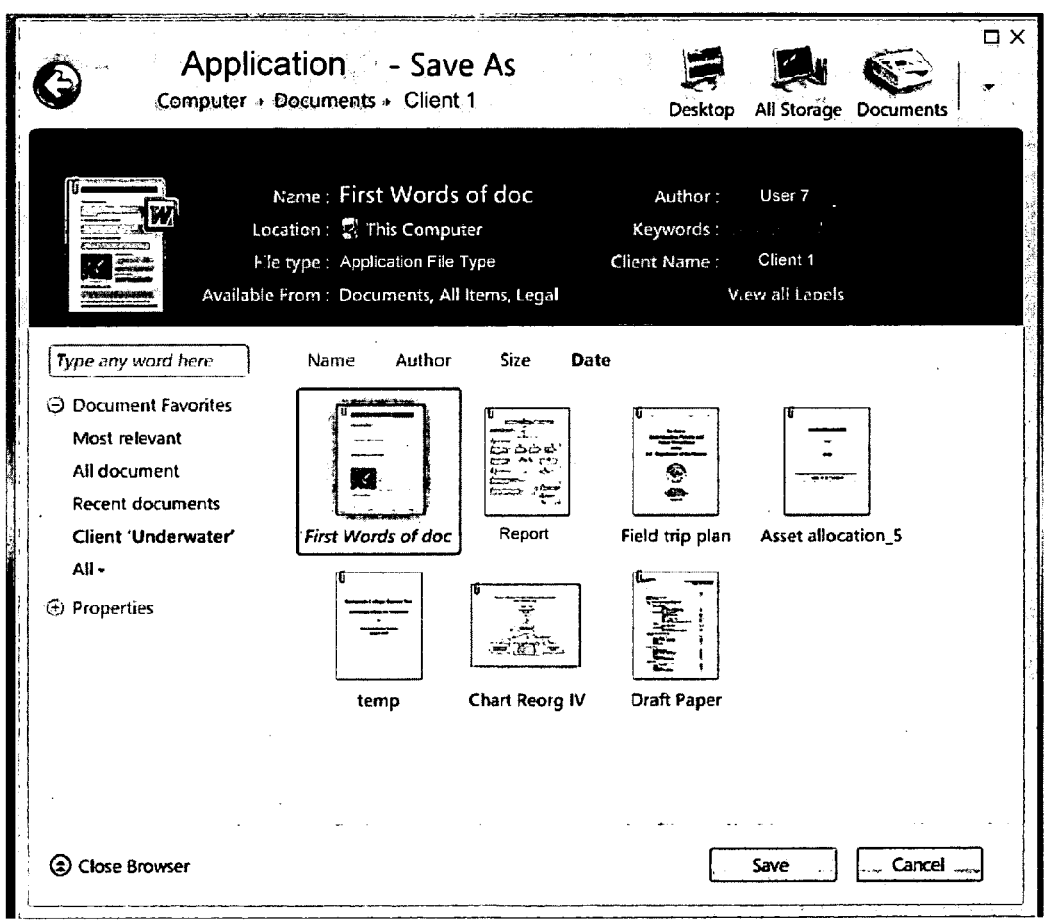
FIG. 6 illustrates a screenshot of an integrated property pane and visual component in accordance with the invention.

Referring now to FIG. 6, a screenshot 600 shows an integrated property pane and visual component in accordance with the invention. A different view from the minimal SaveAs design is to add a browsing component. The different view can be provided as being more useful in some cases for user viewing, but too complicated in others. The browser implementation allows viewing files clustered by various properties. In a WINDOWS XP brand operating system environment, for example, navigating to a specific folder meant putting the saved file there. In the query-oriented browser, navigating to a specific property cluster means assigning that property value to the file being saved. The functionality builds on the experience with which users are familiar.

There are, however, significant differences from a WINDOWS XP brand operating system environment. Previously, there was just one folder tree to navigate. When dealing with a properties-based file system, there can be many properties to which a value can be assigned. The navigational space becomes multi-dimensional, with multiple property axes to consider. Additionally, there can be storage favorites (e.g., collections of multiple predefined property values) that cut across single-property trees. Since users typically visualize only one dimension at a time (without significant confusion), visual confirmation of the choices is provided when switching between different cluster dimensions.

One solution involves use of a "Save Ghost" feature, which is a visual representation of the file being saved. Ghost is a projection or preview of what is about to be saved. The use of Save Ghost has a number of advantages. It provides a simple way to visualize where the file goes and what will be its peers, and enhances the meaning of the property clusters as a location to save to and retrieve from. Save Ghost provides a handle for direct manipulations. For example, dragging the save ghost from "a Word brand Document" to "Text Documents" can have a meaning of changing the document type from Word to Text. In ordered lists, the save ghost can be dragged into the proper position.

Save Ghost provides feedback for invalid property values and immutable properties. For example, navigation to an EXCEL brand spreadsheet document cluster may not show the save ghost there because saving Word documents in Excel format is not supported. Similarly, a view of documents from a previous week does not include the new document because it will be always saved with the current date. At the same time, the use of save ghost enables exploratory navigation to places where the file cannot be saved. Without it, navigation to EXCEL brand spreadsheet documents or documents from a previous week would have to be disallowed (to imply that these are invalid locations.)

The screenshot of FIG. 6 provides a migration path for the current WINDOWS XP brand operating system users. Since the folder location is exposed as one of the file properties, users can initially stick to the known folder navigation rules, and the dialog will provide all the functionality and capabilities of the current SaveAs dialog. This includes one-click copying of all the properties to replace an existing file. As the user becomes more confident with the new interface, they will start using more and more of the few features. However, one drawback of this design is the lack of clear feedback as to how the browser component can be used to set the file properties. There is no visible connection (or interaction) between the top part (property settings) and the bottom part (browsing). Even if the properties dialog provides all the desired capabilities, its usage may be confusing.

Figure 7:
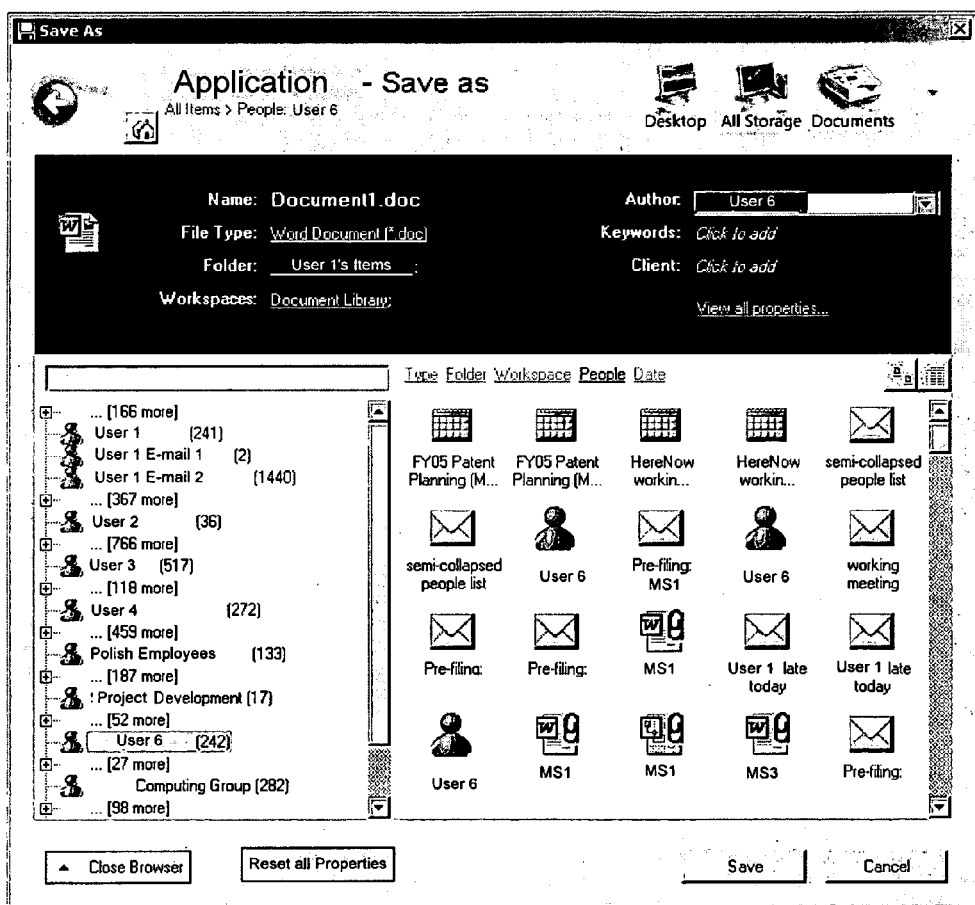
FIG. 7 illustrates a screenshot of an interaction that is synchronized between the property pane and browser component, in accordance with the invention.

Referring now to FIG. 7, a screenshot 700 shows an interaction that is synchronized between the property pane and browser component, in accordance with the invention. Whenever possible, the browser view corresponds to the property being edited, and vice versa. When user selects a property to edit (with the exception of free-form properties like file name or comments,) the browser view switches automatically to the view clustered by that very property. Moreover, the cluster in view corresponds to the currently assigned property value (when available).

When a user selects or types in a new value for the property in the property pane, the view in the browser window changes as soon as the new value is confirmed (e.g., by pressing Enter). This behavior has some analogy in the current SaveAs dialog, where the folder view can be switched by typing in folder path in the file name edit box. For multi-valued properties (e.g., Author or Keywords) the browser view shows an intersection of individual property values (e.g., documents authored by all authors on the list.)

Figure 8:
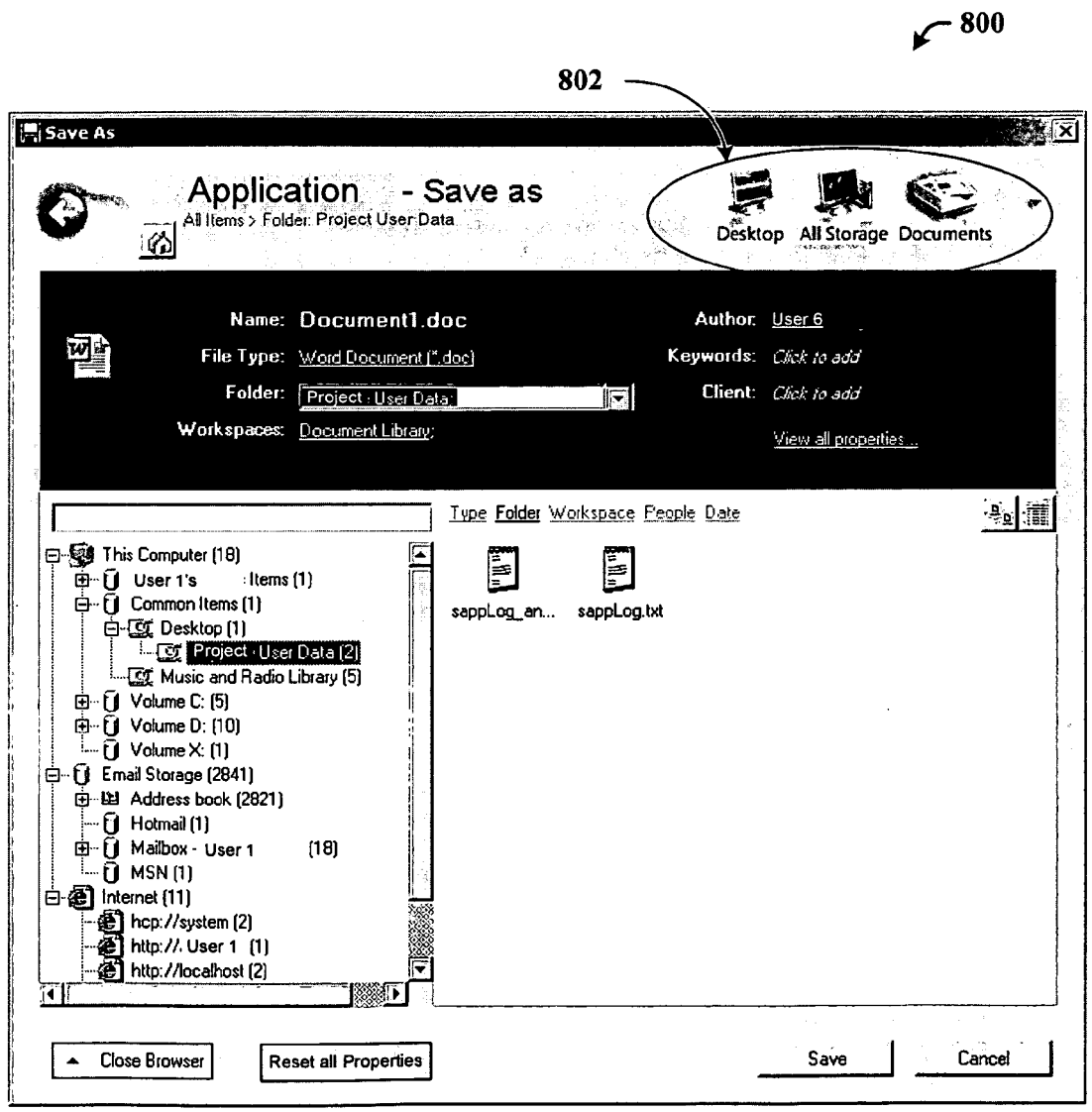
FIG. 8 illustrates a screenshot of an interaction in the view component that is reflected back to the property component, in accordance with the invention.

Referring now to FIG. 8, there is illustrated a screenshot 800 of an interaction in the view component that is reflected back to the property component, in accordance with the invention. When a user starts browsing the property tree in the browser window, displaying the clustered view based on any mutable property automatically visually activates the corresponding property editing field in the property pane. This provides a direct feedback as to which property is being set and to what value it is set. Switching between different property clusters automatically sets the property to the corresponding property value. Multi-value properties can be set by selecting multiple property clusters in the viewer, or through checkboxes next to the cluster name. When the view in the browser is pivoted on an immutable property (e.g., Date) none of the property editing fields is visually activated, and switching between different clusters does not set any property.

A special type of browser view shows the contents of storage favorites 802, which can be defined as groups of items sharing same values for one or more properties. When a view is switched to a storage favorite (which implies putting the new file into that group), a number of file properties can be visually activated showing all the properties affected by the switch and the browser view can be switched to show the other files belonging to this storage favorite location (i.e., sharing the same property values).

The disclosed synchronization mechanism between the property editing fields and property-based browser has multiple advantages. It shows visually that property values can be used to classify files on the disk. This in turn encourages a user to provide meaningful metadata. Synchronization aids in educating users that the same browsing methods can be used later to find and retrieve the file. It combines the best of both worlds when assigning the property value: property editing fields are particularly useful for entering new values (e.g., new keywords) while the browser provides an enumeration of existing values together with feedback as how they are used. Synchronization is intuitive by focusing the dialog functionality on its main purpose, which is to set the file properties. Additionally, it minimizes the cases when the browser view is totally unrelated to the file being saved.

Figure 9:
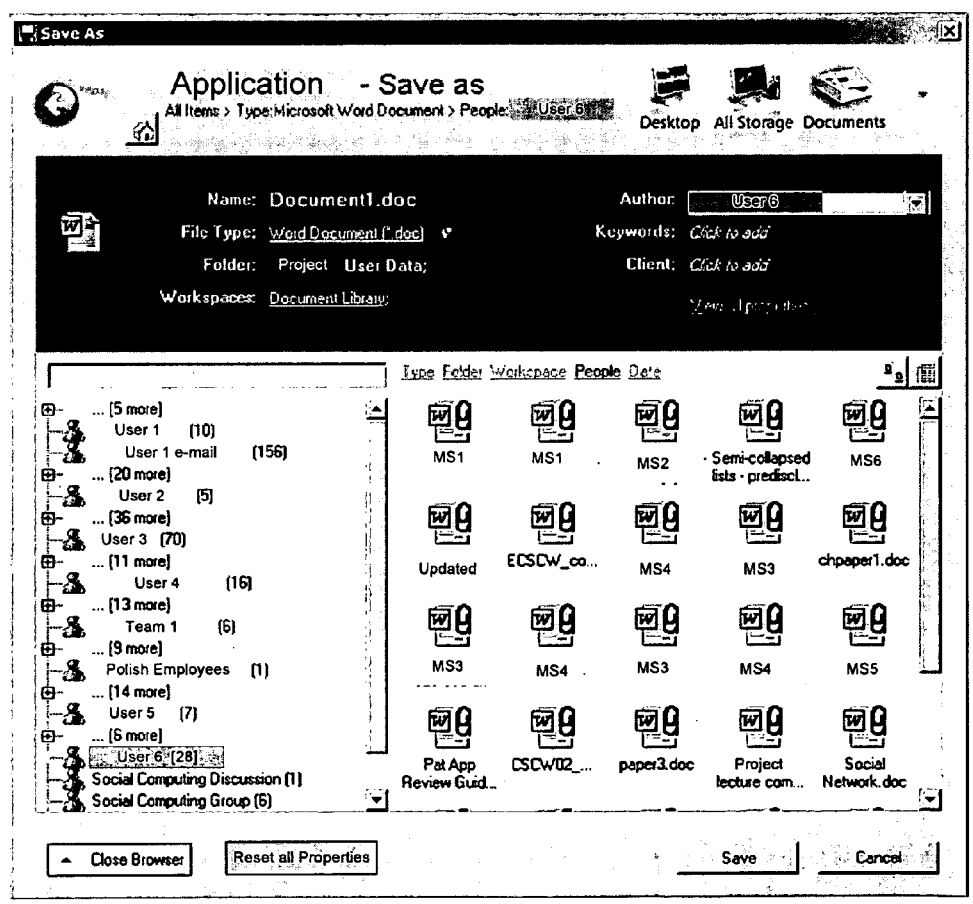
FIG. 9 illustrates a screenshot of an interaction that limits a query scope, in accordance with the invention.

FIG. 9 illustrates a screenshot 900 of an interaction that limits a query scope, in accordance with the invention. Here, the scope is limited to a certain type of document-WORD brand word processing documents, by locking property values. One of the most useful features of the property-based browser is an ability to browse within the result set of the previous query. For example, a query can be made for all the files of type Word Document and then view the results clustered by the Author property. The user interface can provide ways to "pin" the results of a query, whether it is by a double-click command, a command on a right-click menu, or a pin button next to the query cluster. Once the query is pinned, all subsequent browsing is done within the result set of the query.

The browsing component of the SaveAs dialog has the same pinning capability as the standalone browser. For example, a user can pin the scope to Type: Word Document. This has analogy to the functionality of the standard SaveAs dialog, where setting the file type limits the browser view to files with the same extension. The new SaveAs dialog goes further by allowing pinning about any file property: e.g., folder, keyword, author, and so on.

However, limiting the browser scope in the conventional SaveAs dialog was automatic. As soon as the file type was selected, the view was limited to files of that type. Such an approach is too confusing when now dealing with multiple metadata properties. Thus, in the new SaveAs dialog of the subject invention, it is applied only to the storage favorites: selecting one of the favorite places (see the icons in the right top row of FIG. 9) sets the global scope of the browser. The global scope is set to All Items by default (or whatever the user selection is for the default scope), and remains the same until explicitly changed or limited by a subsequent pinning operation.

Since the disclosed architecture ties SaveAs browsing to property editing, the effects of "pinning" on property editing is considered. Pinning limits the browser scope to items with certain properties. Logically, it is assumed that the file being saved acquires the same properties (whenever possible). Moreover, since pinning prevents going outside of the property scope, the properties should be considered locked into a read-only status. Therefore, pinning the query in the browser and locking the property value are two equivalent operations.

Locking property values is a new concept, and is particularly useful with storage favorites. Assume that a user creates a place (storage favorite) that contains "My Word documents about SaveAs" (i.e., Word documents with SaveAs keyword where the user is one of the authors). If the user chooses to put a new document into that group, it should acquire certain values for Type, Keyword, and Author properties. Now, if the user pins that storage favorite, the property values get locked. The user can still modify other properties, or even add additional values to the locked ones (e.g., additional keywords or authors), but the lock prevents the user from accidentally removing or modifying the property values that are critical for the desired group membership. This is an advanced concept (e.g., similar to read-only files), but advanced users will appreciate it.

It is also possible to pin the query without locking the property values. This can happen for queries pivoted on immutable properties. For example, a user can pin a query that looks for files from the last thirty days. This limits the browser scope to the last thirty days, but it will not affect the properties of the file being saved.

Figure 10:
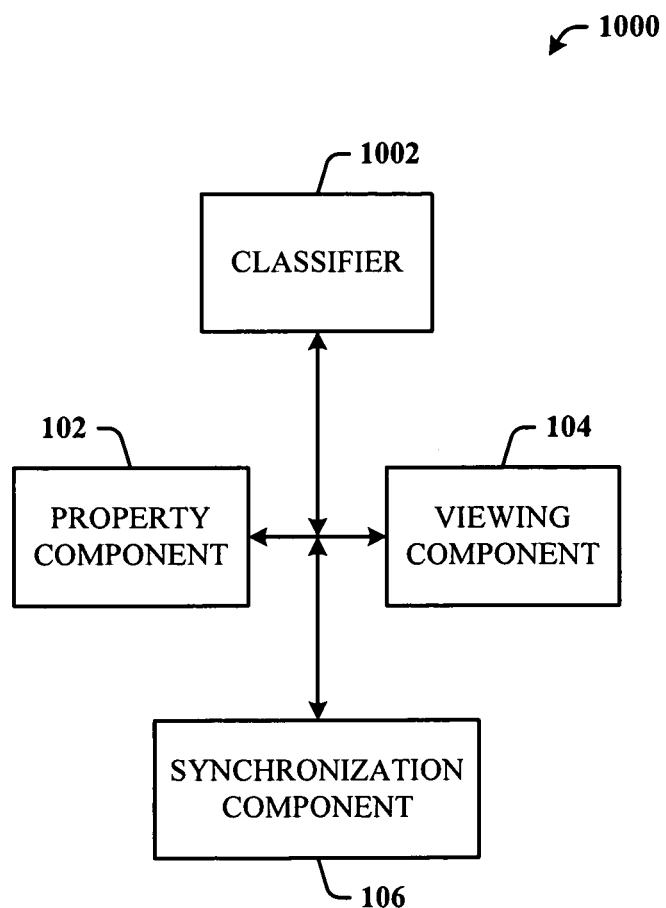
FIG. 10 illustrates a system that employs machine learning in accordance with the invention.

Referring now to FIG. 10, there is illustrated a system 1000 that employs machine learning in accordance with the invention. The subject invention (e.g., in connection with property presentation) can employ various artificial intelligence based schemes for carrying out various aspects of the subject invention. For example, a process for determining what properties to present for a given user can be facilitated via an automatic classifier system and process 1002. The classifier 1002 interfaces to the property component 102, viewing component 104, and synchronization component 106 to facilitate automation of certain features of the system 1000 based on inferences made according to user interactions and user data, for example.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically perform a number of functions, including but not limited to maintaining relationships between an e-mail and its attachment. In another implementation, the relationship is processed more extensively, for example, the e-mail is related to a meeting that is further related to a group of people who attended the meeting (or who were scheduled to attend, but did not), and who are related to this client. Thus, the relationships can be maintained as a string to find the desired file.

The classifier can also be employed to bubble-up the relationships to the properties pane for a given user, as these can be preferred for by the user according to user preferences. Moreover, while saving the related files, the system can automatically connect to those relationships.

In yet another implementation, the classifier learns from user interaction and reacts accordingly to automate the properties displayed in the properties pane according to use interaction history. A user profile can trigger a custom set of properties. The custom set can be modified over time based on use, manual modification, and user interaction with the properties and/or browser window. The properties will then be displayed accordingly.

In still another implementation, the classifier facilitates notifying users of a thread in response to an update made to a file associated with that thread. The associated users are then notified automatically, and perhaps when the file is saved.

The displayed properties can also be selected based on the type of data. For example, if the user routinely deals with two types of data such as financial data and human resources data, depending on what the user chooses to interact, the properties will be adjusted accordingly. Another example includes music data where the artist property is automatically presented as a property in the property pane. If the data is related to pictures, the properties displayed can include location and people. For documents, the property can also include case file number, etc. Any or all of these can be made user modifiable.

Figure 11:
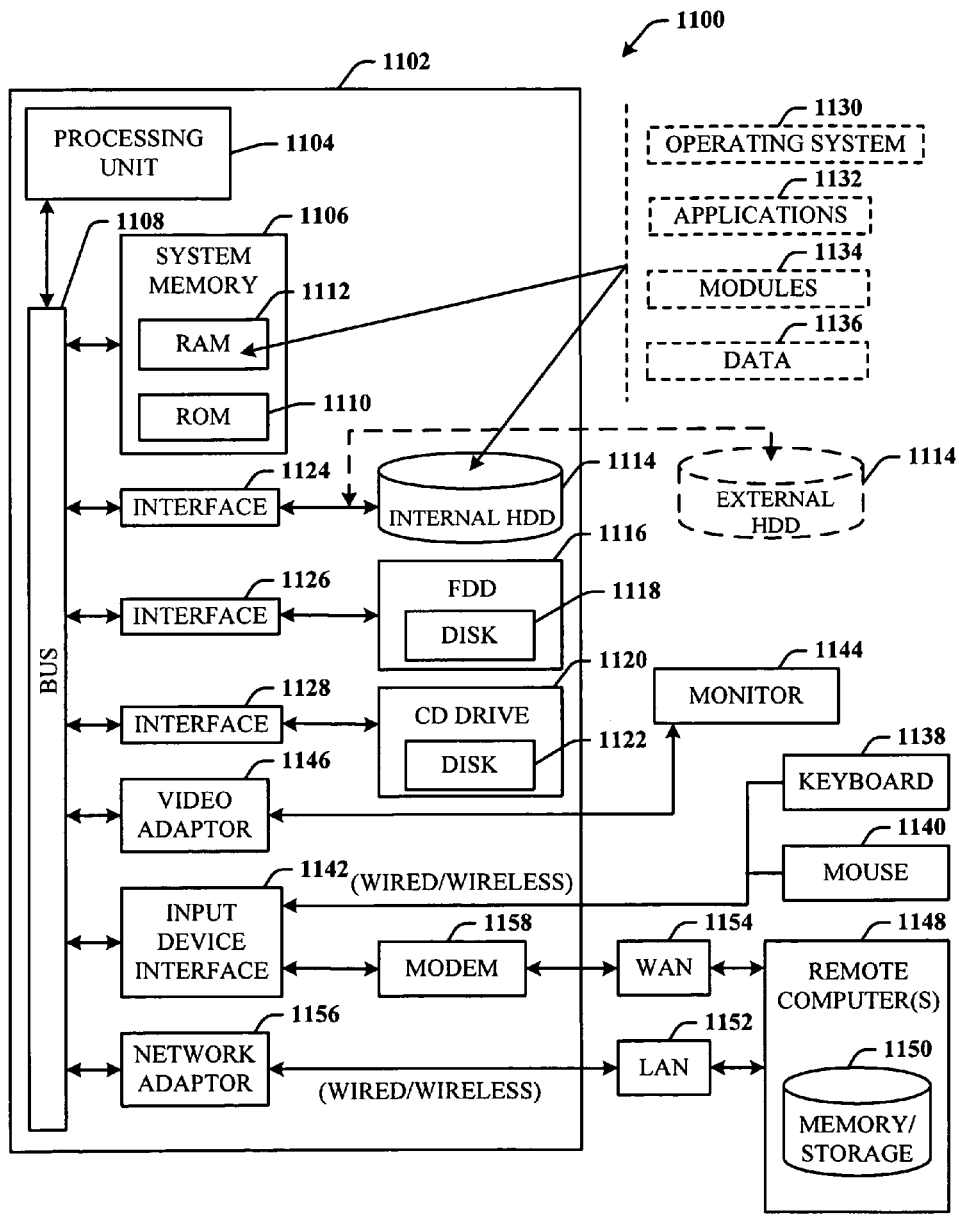
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like that used by a cellular telephone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

Figure 12:
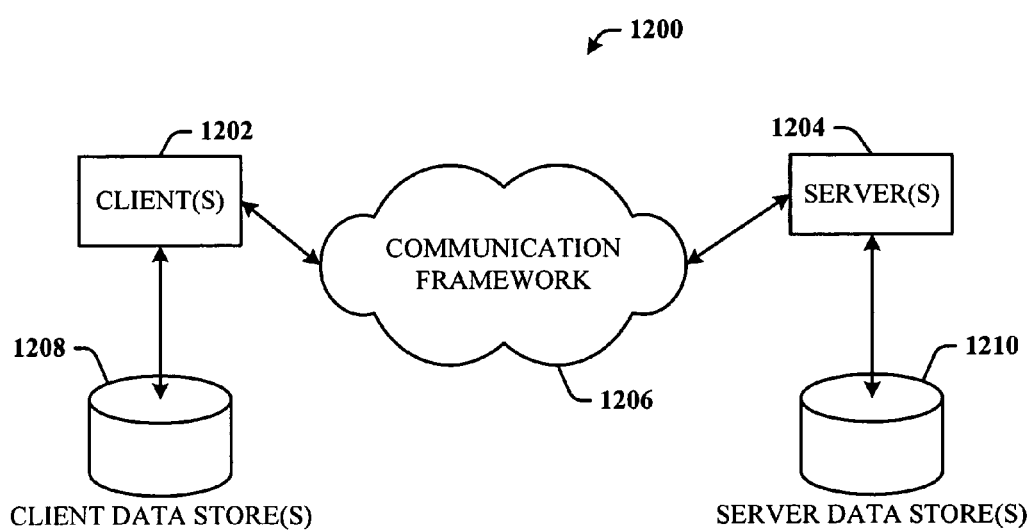
FIG. 12 illustrates a schematic block diagram of an exemplary computing environment in accordance with the invention.

Referring now to FIG. 12, there is illustrated a schematic block diagram of an exemplary computing environment 1200 in accordance with the invention. The system 1200 includes one or more client(s) 1202. The client(s) 1202 can be hardware and/or software (e.g., threads, processes, computing devices). The client(s) 1202 can house cookie(s) and/or associated contextual information by employing the invention, for example. The system 1200 also includes one or more server(s) 1204.

The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating the display of an object in response to a query from a user, comprising:
  receiving in a property component, an assignment of metadata to the object, wherein the assignment includes at least a keyword and at least one additional property;
  accessing the object with the property component;
  accessing other objects stored in a file system that share the same metadata being assigned to the object regardless of locations of the objects in the file system;
  grouping the object and the other objects by the metadata, the object and the other objects grouped by the metadata comprising a cluster of objects that share the same metadata;
  displaying the object and the other objects that share the same metadata, comprising the cluster, with a viewing component configured to be property driven;
  receiving in the property component, a change of the metadata being assigned to the object;
  responsive to the change of the metadata being assigned to the object, automatically modifying the other objects included in the cluster, based on the changed metadata to obtain a modified cluster;
  synchronizing the modified cluster between the property component and the viewing component with a synchronization component; and
  displaying the modified cluster including the object and the other objects according to the modified cluster changed metadata.

2. The method of claim 1 wherein receiving in the property component, a change of the metadata, further comprises providing a plurality of editing fields configured to enable to user to modify the metadata.

3. The method of claim 2 wherein one of the editing fields includes an author.

4. The method of claim 2 wherein one of the editing fields includes a title.

5. The method of claim 2 wherein one of the editing fields includes a subject.

6. The method of claim 2 wherein one of the editing fields includes a category.

7. The method of claim 2 wherein one of the editing fields includes a keyword.

8. The method of claim 1 wherein receiving in the property component, a change of the metadata, further comprises:
   providing a plurality of editing fields configured to enable to user to modify a property of the metadata;
   receiving a selection of one of the editing fields; and
   modifying the grouping of the objects including the property before the user modifies the property of the metadata associated with the selected editing field.

9. The method of claim 8 further comprising synchronizing communication between the property component and viewing component associated with the modified cluster.

10. The method of claim 9 further comprising clustering the modified cluster according to the metadata associated with the selected editing field.

11. A system that facilitates the modification of metadata associated with an item in a file system comprising:
   a memory storing components for execution by a processor, the components comprising:
   a property component that enables the selection of a property associated with an item in a graphical user interface property pane;
   a viewing component programmed to be property directed that displays the selected item having the selected property and substantially all other items having the selected property; and
   a synchronization component that synchronizes communication between the property component and the viewing component;
   wherein the viewing component is configured to stack the item and the substantially all other items according to having the selected property such that each stack of items includes items that share a same value for the selected property, and wherein, when an additional property is selected associated with the item, the synchronization component enables the viewing component to substantially instantaneously display a modified stack organized based on the additional property such that each stack of items includes items that share the same value for the selected property and a same value for the selected additional property.

12. The system of claim 11 wherein the additional property is a new property.

13. The system of claim 11, wherein when the additional property is a new property, the viewing component displays a new stack.

14. The system of claim 13 wherein the new stack includes a document ghost associated with the new property.

15. The system of claim 11 wherein the additional property is a new property for the item and the additional property is an existing property for at least some of the other items and wherein the viewing component displays a modified stack including the item and the at least some of the other items according to the additional property.

16. The system of claim 11 wherein the additional property is an invalid property for the item and the additional property is an existing property for at least some of the other items and wherein the viewing component displays a modified stack including the item and the at least some of the other items including a visual feedback that the additional property for the item is an invalid property for the item.

17. The system of claim 11, wherein the property component includes a plurality of editing fields configured to enable changes in the metadata.

18. The system of claim 17 wherein one of the editing fields includes an author.

19. The system of claim 17 wherein one of the editing fields includes a title.

20. The system of claim 17 wherein one of the editing fields includes a subject.

21. The system of claim 17 wherein one of the editing fields includes a category.

22. The system of claim 17 wherein one of the editing fields includes a keyword.

\* \* \* \* \*